(No Model.)  2 Sheets—Sheet 1.

T. MEIKLE.
WHEEL PLOW.

No. 330,252. Patented Nov. 10, 1885.

WITNESSES
R. W. Smith
A. H. Smith

INVENTOR
Thos Meikle
By his Attorney
R. D. O. Smith (No Model.) 2 Sheets—Sheet 2.

T. MEIKLE.
WHEEL PLOW.

No. 330,252. Patented Nov. 10, 1885.

UNITED STATES PATENT OFFICE.

THOMAS MEIKLE, OF LOUISVILLE, KENTUCKY, ASSIGNOR TO THE THOMAS MEIKLE COMPANY, OF SAME PLACE.

WHEEL-PLOW.

SPECIFICATION forming part of Letters Patent No. 330,252, dated November 10, 1885.

Application filed February 7, 1885. Serial No. 155,253. (No model.)

*To all whom it may concern:*

Be it known that I, THOMAS MEIKLE, of Louisville, in Jefferson county, in the State of Kentucky, have invented a new and useful Improvement in Wheel or Sulky Plows; and I do hereby declare that the following is a full and accurate description of the same, reference being had to the accompanying drawings, wherein—

Figure 1:
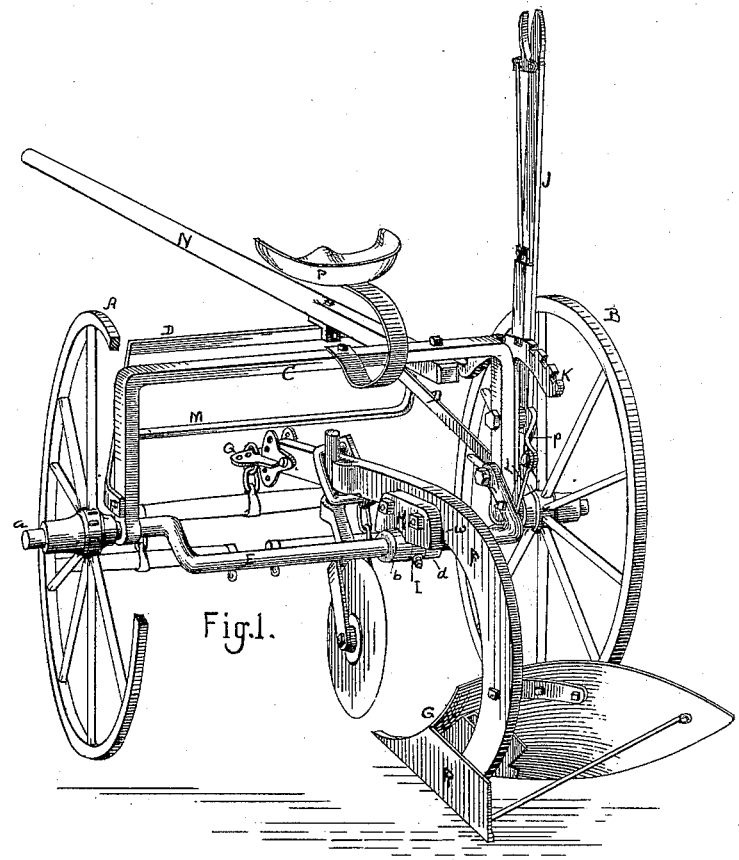
Figure 2:
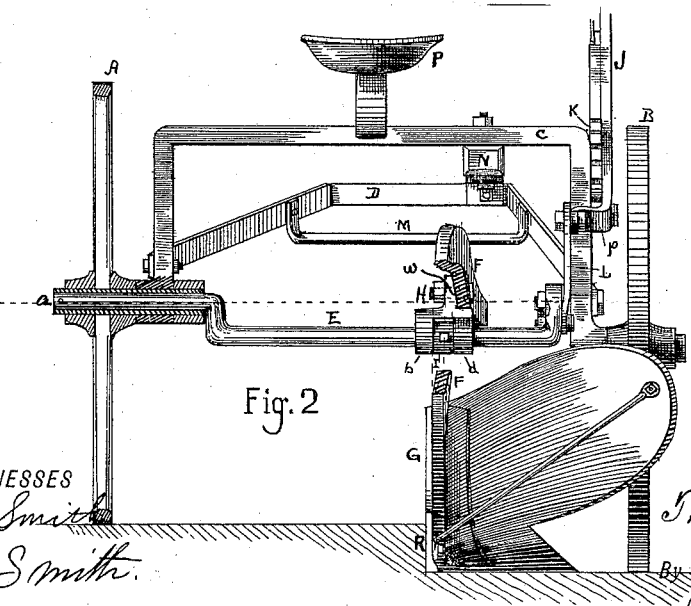
Figure 3:
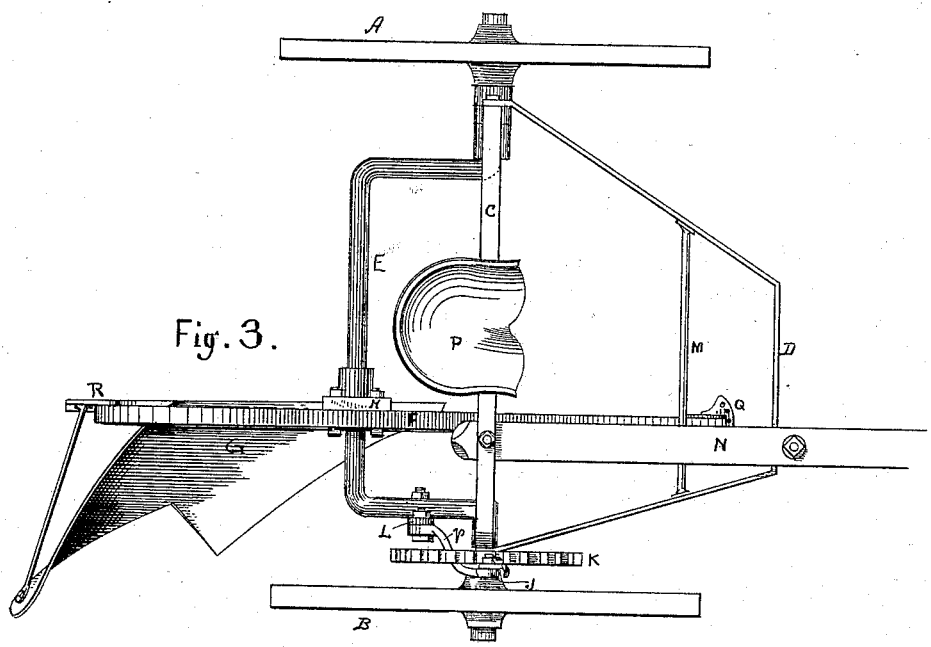
Figure 4:
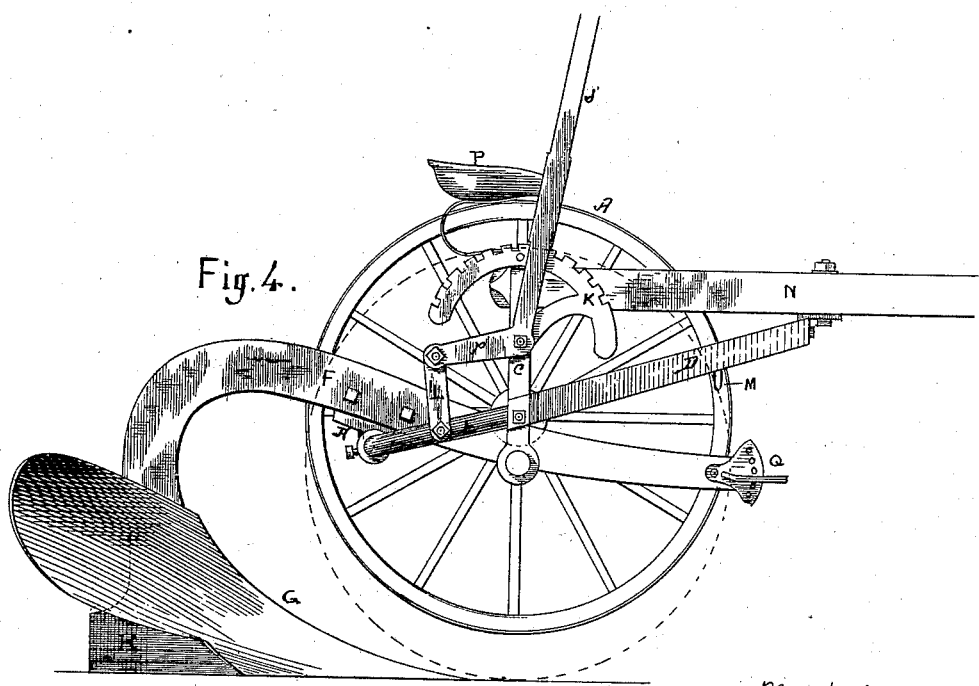

Figure 1 is a perspective view of my plow. Fig. 2 is a rear elevation of the same. Fig. 3 is a plan of the same. Fig. 4 is a side elevation of the same.

Heretofore riding or sulky plows have generally had devices for leveling the axle by depressing or elevating one wheel, and other devices for raising or lowering the plow. These devices require a considerable knowledge of mechanics on the part of the operator to enable him to set them up in the field, make proper adjustments, and give them proper care generally while in use—a much greater knowledge than is usually possessed by the average farm-laborer. Experiment has proved that it is possible to dispense entirely with the usual apparatus for leveling the carriage at varying depths of the furrow. I do this by a compensating adjustment of the bail and arch, establishing an average furrow-depth by giving a slight inclination, sufficient to cause the plow-bottom to be level, when in action, with the landside of the plow. With this arrangement equally good work can be done at all depths, and the attendant be relieved of all bother with leveling devices; the plow takes care of itself, and the plowman's whole business is reduced to driving the team; but one adjustment of parts is required, and that can be made by the manufacturer before the plow leaves the shop; there is but one place for the pole, whether for two or three horses; there is but one place to clamp the plow-beam unless different-sized bottoms are used; there is no leveling device, no horse-power lift, or other complications; the only skill required is that which is necessary to properly hitch or adjust the clevis—as with a hand-plow—because the depth and width of furrow are regulated by that hitch, as with a hand-plow.

I am aware that some plows have heretofore been made without leveling appliances; but these plows differ from mine structurally, as will appear more fully from the following particular description.

I am also aware that one end of the bail has been used as a spindle for one of the wheels; but so far as I know the spindle end of the bail has always been so fashioned as to give a crank motion to the wheel-spindle in raising or lowering the plow. This is objectionable because of the extra strain upon said bail and the necessity of making it heavier and stronger than otherwise would be necessary.

The improvements which I propose to claim herein relate, first, to the structure of the crank-bail, one end whereof passes through the arch and constitutes the spindle for the landside-wheel without crank action of said wheel, and to the saddle with an inclined face for holding the plow-bottom in a plane oblique to the plane of the bail to level said bottom when in action.

Referring now to the drawings, A B are the bearing-wheels. C is the vertical arch of the axle. D is the horizontal arch of the same, the axle being formed of these parts to secure rigidity, strength, and lightness.

E is the bail, to which the beam F of the plow G is secured by the coupling A. The bail E is at the landside end jointed to the arch C, at or near the axis of the land-wheel A, and it is convenient to pass the end of said bail horizontally through an eye in the lower extremity of the landside end of the arch C, and make said extended bail end *a* constitute the spindle or axle of said landside-wheel. Said spindle may be provided with a thimble skein or sleeve to form a wearing-surface, as shown. At the other or furrow side the bail E is jointed to the furrow end of the arch C at a distance above the spindle of the furrow-wheel B equal to the average depth of the furrow—say, five (5) inches; but this average depth is arbitrary, and may be greater or less than stated, as may be preferred for different soils or in different localities. The wheels are therefore properly set to run with the arch, bail, and plow-bottom level at the average depth, and the slight variations from level when plowing slightly deeper or less deep are of no practical importance.

The plow-beam F is secured to the bail E by means of an L-shaped coupling-plate, H, which extends up by the side of the beam, and is fastened thereto by bolts which pass horizontally through both plate and beam. On the bottom of the horizontal part of said coupler there are two lugs, *b* and *d*, which encircle and confine the bail E, and between said lugs there is placed around the bail a collar, I, fastened in position on the bail by a set-screw, and this single collar and its set-screw prevent any side movement of the coupler H unless a change of adjustment is necessary.

On the furrow side the bell-crank hand-lever J is pivoted, and is provided with a hand-latch to engage with a notched segment, K, which is secured to the arch C, to retain said lever in any position selected. The short arm *p* of the lever J is connected by a link, L, with the bail E, and thereby power applied to said lever causes the bail and the plow to be raised from the furrow, and it may be raised entirely from the ground and supported there for transportation. The first lifting movement raises the front end of the beam, and thereby inclines the point of the plow upward, so that as it continues to advance it will itself run out of the ground, and the further lift only requires power to raise the weight of the plow.

When the front of the beam has been raised a short distance, its upward movement is arrested by the front of the arch D or by a rod, M, attached thereto for that purpose, and the further lift then elevates the plow bodily and brings it more or less nearly to a level position above the ground.

The tongue N is at its rear end bolted to the arch C and also to the arch D, and is thereby strongly braced. The seat P is mounted upon the arch C, and the arch D and rod M serve as foot-rests.

A colter may be employed, and it may be of any approved style or mode of attachment to the plow-beam. The clevis Q admits both vertical and lateral adjustment of the hitch to determine the depth and width of the furrow.

The landside R is made shorter than usual in plows heretofore. Its rear end is about opposite the rear angle of the share. This length is sufficient to resist the lateral thrust due to the resistance to the share-cut in the soil, and the advantage is that, the landside being short, the plow is enabled to turn a square corner without backing off and running under again, as is necessary with plows having the usual long landside.

Having described my invention, I claim as new—

1. An arch, C, provided at one end with a permanently-fixed spindle, and at the other end provided with an eye above the axial line of said spindle, combined with the bail E, pivoted at one end to said arch, above said spindle, and at its other end provided with the portion *a*, projected through said eye to constitute a wheel-spindle close to the arch, and with its axis coincident with the axis of the bail.

2. In a sulky-plow, an arch, C, wheels A B, whose spindles are permanently set at different levels, a plow-bail, and mounted thereon an L-shaped coupler with an inclined face, *w*, to hold the plow-bottom inclined to the axis of the bail, to be level while in action, as set forth.

THOS. MEIKLE.

Witnesses:
C. H. MOUTZ,
GEO. E. PARKER.